United States Patent
Bradbury et al.

(10) Patent No.: US 9,715,377 B1
(45) Date of Patent: *Jul. 25, 2017

(54) BEHAVIOR BASED CODE RECOMPILATION TRIGGERING SCHEME

(71) Applicant: International Business Machines Corporation, Armonk, NY (US)

(72) Inventors: Jonathan D. Bradbury, Poughkeepsie, NY (US); Giles R. Frazier, Austin, TX (US); Michael Karl Gschwind, Chappaqua, NY (US); Christian Jacobi, Poughkeepsie, NY (US); Anthony Saporito, Highland, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,346

(22) Filed: Jan. 4, 2016

(51) Int. Cl.
*G06F 9/45* (2006.01)
*G06F 9/38* (2006.01)
*G06F 12/08* (2016.01)
*G06F 9/455* (2006.01)

(52) U.S. Cl.
CPC ............ *G06F 8/443* (2013.01); *G06F 9/4552* (2013.01)

(58) Field of Classification Search
CPC ... G06F 8/443; G06F 8/41; G06F 8/48; G06F 9/45516; G06F 9/4552; G06F 12/0862; G06F 12/0864; G06F 12/0897; G06F 9/3806; G06F 9/3836; G06F 9/3844; G06F 9/3851; Y02B 60/1225
See application file for complete search history.

(56) References Cited

U.S. PATENT DOCUMENTS

| | | | |
|---|---|---|---|
| 6,275,782 B1 * | 8/2001 | Mann | G06F 7/70 702/182 |
| 6,449,714 B1 * | 9/2002 | Sinharoy | G06F 9/3802 711/125 |
| 7,228,404 B1 * | 6/2007 | Patel | G06F 9/30174 712/228 |

(Continued)

OTHER PUBLICATIONS

Chen et al., Autocorrelation analysis: a new and improved method for measuring branch predictability, Jun. 2011, 2 pages.*

(Continued)

*Primary Examiner* — Thuy Dao
(74) *Attorney, Agent, or Firm* — Cantor Colburn LLP; William A. Kinnaman, Jr.

(57) ABSTRACT

Techniques relate to a behavior based code recompilation triggering scheme. A determination is made whether a fingerprint is present in software that is currently executing on a processor of a computer system, where the fingerprint includes a representation of a sequence of behavior that occurs in the processor while the software is executing. In response to determining that the fingerprint is not present in the software currently executing on the processor, monitoring continues of the software executing on the processor for the fingerprint. In response to determining that the fingerprint is present in the software currently executing on the processor, a compiler is caused to perform a recompilation to the software.

20 Claims, 6 Drawing Sheets

(56) References Cited

U.S. PATENT DOCUMENTS

| | | | |
|---|---|---|---|
| 7,730,460 | B1 | 6/2010 | Warren et al. |
| 8,136,124 | B2 | 3/2012 | Kosche et al. |
| 8,141,058 | B2 | 3/2012 | Berg et al. |
| 8,453,129 | B2 | 5/2013 | Stephenson et al. |
| 8,782,629 | B2 | 7/2014 | Sun |
| 9,442,729 | B2* | 9/2016 | Strong ............... G06F 9/30145 |
| 9,459,849 | B2* | 10/2016 | Bates .................... G06F 9/4552 |
| 2001/0011346 | A1* | 8/2001 | Yoshimi ............... G06F 9/3844 |
| | | | 712/239 |
| 2003/0204705 | A1* | 10/2003 | Oldfield ............. G06F 9/30145 |
| | | | 712/207 |
| 2009/0271772 | A1* | 10/2009 | Stephenson ......... G06F 9/45516 |
| | | | 717/145 |
| 2013/0007425 | A1* | 1/2013 | Cantin .................. G06F 9/3848 |
| | | | 712/240 |
| 2013/0054942 | A1 | 2/2013 | Serrano |
| 2013/0104111 | A1* | 4/2013 | Bates .................... G06F 8/4432 |
| | | | 717/148 |
| 2014/0297996 | A1* | 10/2014 | Jayaseelan ........... G06F 9/3848 |
| | | | 712/239 |
| 2016/0103683 | A1* | 4/2016 | Ueno ....................... G06F 8/41 |
| | | | 712/239 |

OTHER PUBLICATIONS

Gope et al., Bias-Free Branch Predictor, Dec. 2014, 12 pages.*
Giles R. Frazier, et al., "Configurable Code Fingerprint," U.S. Appl. No. 14/987,220, filed Jan. 4, 2016.
Giles R. Frazier, et al., "Programmable Code Fingerprint," U.S. Appl. No. 14/987,263, filed Jan. 4, 2016.
Giles R. Frazier, et al.,"Automated Compiler Operation Verification," U.S. Appl. No. 14/987,400, filed Jan. 4, 2016.
Giles R. Frazier, et al.,"Code Fingerprint-Based Processor Malfunction Detection," U.S. Appl. No. 14/987,395, filed Jan. 4, 2016.
Giles R. Frazier, et al.,"Scheme for Verifying the Effects of Program Optimizations," U.S. Appl. No. 14/987,377, filed Jan. 4, 2016.
H.Chen, et al.,"Continuous Adaptive Object-Code Re-optimization Framework", Springer-Verlag Berlin Heidelberg, 2004, pp. 1-15.
IBM, "Power ISA V 2.07B," Power.org, Book II, Apr. 9, 2015, pp. 733-838.
List of IBM Patents or Patent Applications Treated as Related; Date Filed: Jan. 4, 2016, pp. 1-2.

* cited by examiner

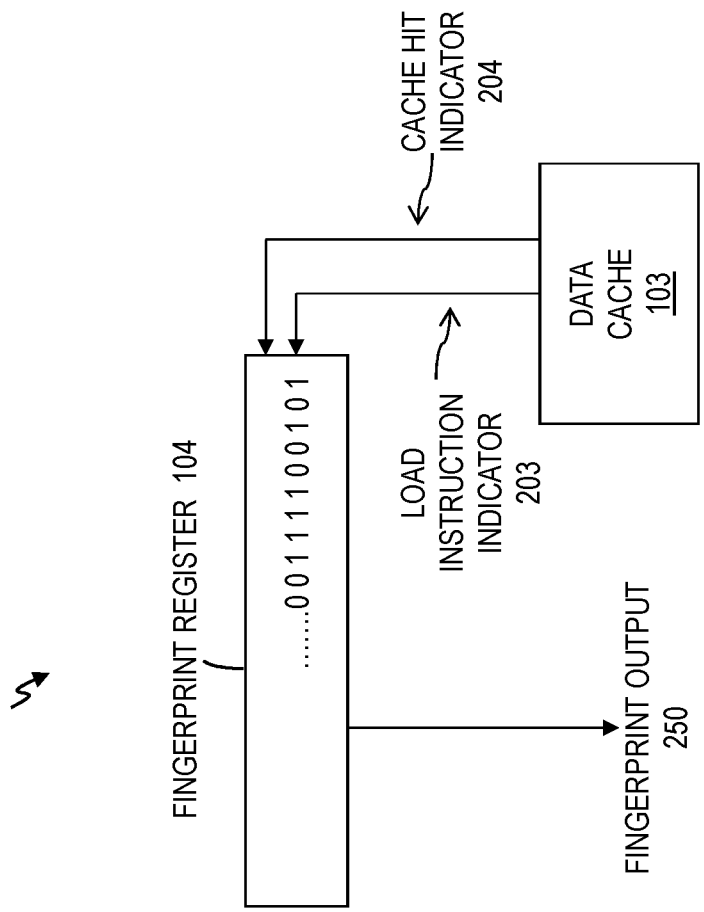

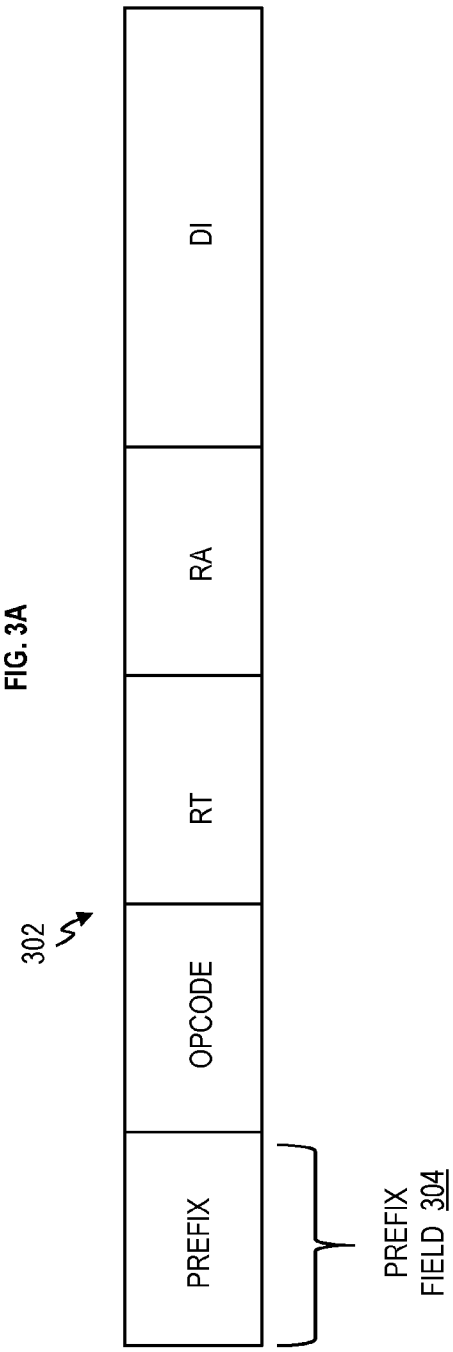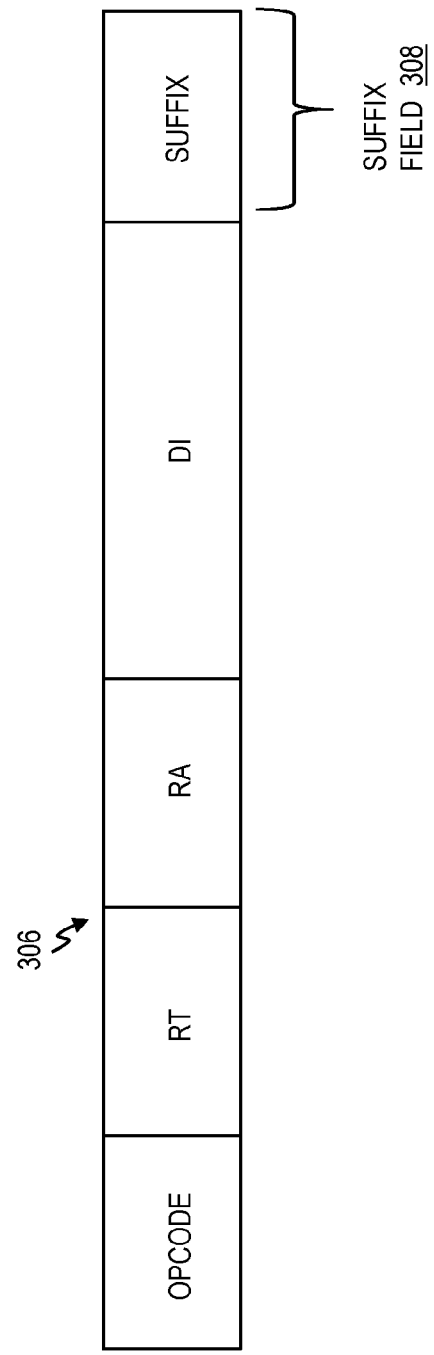

BEHAVIOR BASED CODE RECOMPILATION TRIGGERING SCHEME

BACKGROUND

The present invention relates generally to computer processors, and more specifically, to behavior based code recompilation triggering scheme.

In computing, just-in-time (JIT) compilation, also known as dynamic translation, is compilation performed during execution of a program at run time rather than prior to execution. Most often this consists of translation to machine code, which is then executed directly, but can also refer to translation to another format.

The machine code that is generated may from time to time require recompilation in order to dynamically adapt to changes in either the available processor resources or the data being processed. Thus it is advantageous to have a method of identifying the situations in which such a dynamic recompilation is needed.

SUMMARY

Embodiments include a method, system, and computer program product for a behavior based code recompilation triggering scheme. A determination is made whether a fingerprint is present in software that is currently executing on a processor of a computer system, where the fingerprint includes a representation of a sequence of behavior that occurs in the processor while the software is executing. In response to determining that the fingerprint is not present in the software currently executing on the processor, monitoring continues of the software executing on the processor for the fingerprint. In response to determining that the fingerprint is present in the software currently executing on the processor, a compiler is caused to perform a recompilation to the software.

BRIEF DESCRIPTION OF THE DRAWINGS

FIG. 2 depicts a fingerprint recognition function of a fingerprint circuit in accordance with an embodiment.

FIG. 3A depicts an instruction with an example prefix field for a prefix according to an embodiment.

FIG. 3B depicts an instruction with an example suffix field for a suffix according to an embodiment.

DETAILED DESCRIPTION

Figure 1:
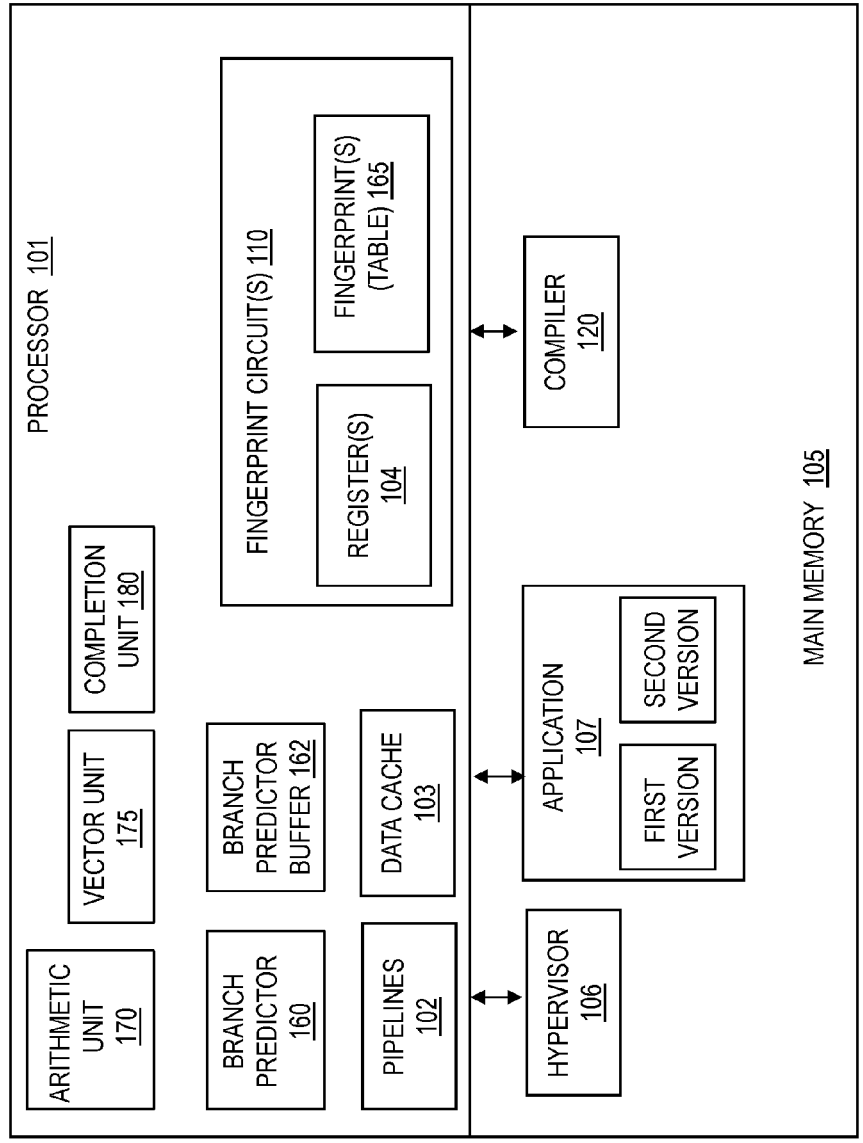
FIG. 1 depicts a computer system for implementing schemes for verifying the effects of application-level software program optimizations in accordance with an embodiment.

As tasks vary in managed runtime environments, it is often advantageous to dynamically recompile the just-in-time code periodically to optimize performance for the current operations being executed. For example, a compiler may have generated an optimized code segment during which it expects load instructions to have a specific sequence of load hits and misses. As this code executes, however, the expected hit miss sequence may unexpectedly stop occurring due to extraneous factors such as interference from other programs that share the cache and/or storage subsystem. When such situations occur, however, it is difficult to quickly recognize them. In the state-of-the-art, such recognition would involve inserting markers in the code to initiate performance monitor counters at the beginning and end of the code segment, and periodically evaluate them to determine if the expected data cache hit sequence is actually occurring. This is a time consuming procedure that detracts significantly from any performance improvement due to optimization, and delays the recognition of situations in which a code recompilation to correct such problems is needed.

In other situations, there may be an expectation that a certain set of performance metrics should all be within a certain range, and to recognize when they deviate outside the range. Doing this with existing state-of-the-art technology involves constant use of performance monitor counters to monitor the metrics, which is a process that requires significant software overhead.

Embodiments, therefore, provide the means for the hardware (e.g., fingerprint circuit) to monitor a code section and determine if the expected behavior (e.g., data cache hit-miss sequence, set of metrics within a specified range, etc.) is being exhibited. If it is not, then the hardware is configured to cause a lightweight trap, referred to as an Event-Based Branch (EBB) in order to enable a software EBB handler to recompile the machine code. It should be noted that an EBB transfers control directly to an application-level EBB handler without involving the operating system. Such direct transfer of control to the EBB handler is advantageous because it eliminates the large amount of overhead in transferring control to an operating system, which would be necessary for a typical interrupt or trap. Also, by automatically detecting whether the expected behavior is occurring rather than requiring software to activate and analyze multiple counters to make this determination, embodiments eliminate a significant amount of overhead and enable a much more rapid recognition of situations in which a recompilation is needed. The elimination of the overhead and the increased speed at which recognition of the need for recompilation exists significantly improve the performance of the executing program.

State-of-the-art processors provide a compiler with access to performance monitor counters. These counters can be configured to count various events such as cache hit rates, misprediction rates, fetch rates, completion rates, etc. Use of these counters to measure behaviors of specific sections of code requires real-time software intervention in order to initialize them and periodically analyze their results. These time consuming operations make detailed analysis of specific code sections in real time unproductive due to the processing overhead. Also, counters are not able to recognize specific sequences of behavior such as sequences of cache misses and hits, branch misses and hits, sequences of taken/not taken branches, and other sequential behaviors. These existing methods, therefore, are incapable of causing code recompilation immediately upon the occurrence of a specific behavior.

Now turning to the figures, FIG. 1 depicts a computer system 100 configured to implement schemes for verifying the effects of software program optimizations in accordance with an embodiment. The computer system 100 includes a processor 101 in communication with a main memory 105. The processor 101 includes one or more processor pipelines 102 that execute instructions using cache memory 103.

Computer programs, such as hypervisor 106 and software application 107 are stored in main memory 105 and executed by the processor 101. Any appropriate number of software applications may be executed by a computer system such as computer system 100. In the computer system 100, the software application 107 may be high-level source code is compiled by a compiler 120 for execution on the processor 101. The compiler 120 is a run-time complier configured to recompile the code upon an indication (such as a trigger) from a fingerprint circuit 110. The hypervisor 106, applications 107, and/or any other program stored in main memory 105 may all be considered software programs, software, code, etc. Examples are provided for the compiler 120 in conjunction with the fingerprint circuit 110 determining when to recompile the software, such as when to recompile application 107.

The processor 101 includes a branch predictor 160. The branch predictor 160 may be a digital circuit designed to predict either the direction (e.g., taken or not taken) and target address of a branch instruction before it is executed. The purpose of the branch predictor 160 is to improve the flow of instructions in the pipeline of the processor 101. The history of whether a branch instruction at a given address is taken or not taken, and in some cases target address of the branch instruction, is stored in the branch predictor buffer 162.

The processor 101 includes one or more fingerprint circuits 110 designed to monitor the execution of software programs (e.g., application 107, hypervisor 106) on the processor 101. The fingerprint circuit 110 includes predefined/specified code fingerprints 165. In some embodiments, the fingerprints 165 may be implemented as fingerprint tables. The fingerprint circuit 110 is configured to automatically monitor the software program execution of, e.g., the application 107, in order to recognize the occurrence of a specified fingerprint 165, and the occurrence of the specified fingerprint 165 indicates the time that recompilation of the application 107 is needed by the compiler 120. The fingerprint circuit 110 is also configured to signal an alert at that point (i.e., the segment of code) at which an expected fingerprint indicative of the need for code recompilation by causing an Event-Based Branch (EBB), also referred to as a "lightweight interrupt," that transfers control to a software EBB handler without involving the operating system. Since operating system involvement causes a large amount of overhead, such direct transfer of control to the application-level EBB handler significantly improves performance. By the fingerprint circuit 110 issuing the EBB, the EBB is configured to trigger the compiler 102 to perform a recompilation (with the aim of improving performance or decreasing power, or any other goal to improve program behavior). Depending on the embodiment, the EBB handler may either request the compiler 102 to do the recompilation, or it may, itself, perform the recompilation (e.g., if the EBB handler is part of the compiler). Different examples of utilizing the fingerprint circuit 110 to determine when to trigger recompilation are discussed herein.

Various counters and modules may be utilized to count incoming events and compare against a predefined number of events to determine when a fingerprint is recognized. FIG. 1 may include a fingerprint recognition function in the fingerprint circuit 110 according to an embodiment for which fingerprints 165 consist of counts of event occurrences between two specified instructions. Examples of such fingerprints may include a count of pipeline stalls, data cache prefetch misses, branch taken/not taken prediction misses, and/or a branch target hit/miss prediction hits/misses. It is appreciated that other fingerprints may also be included in the hardware of the fingerprint circuits 110.

The fingerprint circuit 110 may comprise one or more fingerprint shift registers 104 in some embodiments. The fingerprint shift register 104 is used to store the output of the software code that is currently executing, such that the output (value) of the fingerprint shift register 104 is compared to the fingerprint 165 to determine a match. The fingerprint shift register 104 is a physical register that contains measured fingerprints. Also, the fingerprint circuit 110 includes logic circuits to function as discussed herein. In one implementation, the fingerprint circuit 110 may also include firmware, microcode, etc., to execute the functions discussed herein.

In one implementation, the fingerprint circuit 110 may monitor execution of the software application 107 in order to determine a match to a single specified fingerprint 165. In response to finding the match, the fingerprint circuit 110 is configured to trigger the EBB that alerts the EBB handler that a recompilation is needed. As mentioned previously, the EBB handler may either request the compiler 102 to do the recompilation, or it may, itself, perform the recompilation (e.g. if the EBB handler is part of the compiler).

In another implementation, the fingerprint circuit 110 may monitor execution of the software program 107 in order to determine a match to a combination (set) of specified fingerprints 165, such as two or more different specified fingerprints 165. In response to finding the match to the combination of specified fingerprints 165 (e.g., two or more different specified fingerprints 165), the fingerprint circuit 110 is configured to indicate that the specified fingerprint has been recognized and cause an EBB that transfers control to an EBB handler, which in turn requests the compiler 120 to perform the recompilation, or performs the recompilation itself. Accordingly, the machine code for application (107) source code is dynamically recompiled.

However, when the specified fingerprint(s) 165 are not recognized, the fingerprint circuit 110 is configured to continue monitoring the output of the application 107 as it executes without causing an EBB.

For illustration purposes and not limitation, a few examples of code fingerprints 165 are discussed.

1) One code fingerprint may be a data cache hit miss sequence. For example, the data cache hit and miss sequence may be [hit, hit, miss, hit, miss, miss] for one code fingerprint. This same data cache hit and miss sequence may be represented by [1100100] in the fingerprint shift register 104, where '1' represents a hit and '0' represents a miss. In one implementation, the fingerprint register 104 may store the actual output of the software program 107 currently executing on the processor 101, such that the fingerprint circuit 110 can check the fingerprint shift register 104 and recognize when the output of the software program 107 in the fingerprint shift register 104 matches the data cache hit miss sequence of an expected fingerprint 165.

2) Another code fingerprint may be a data cache hit miss sequence that is present when a given instruction is executed. The given instruction may have a predefined address (XYZ). As noted above for illustration purposes, the data cache hit miss sequence may be the sequence of cache hits and misses [hit, hit, miss, miss, hit, miss, miss] that occurred in load instructions leading up to the instruction at address XYZ. In this case, the fingerprint circuit 110 waits for execution of the given instruction of the software program 107 and only checks the fingerprint register 104 at the time when the given instruction (with address XYZ) executes.

3) A code fingerprint may be branch prediction hit miss sequence for a specific set of branches identified by an instruction prefix. In such an embodiment, branch instructions have an operand that identifies whether or not they are to be used in the fingerprint. When a branch with an operand indicating that it is part of the fingerprint is executed, either a 1 or a 0 is shifted into a fingerprint register 104, depending on whether the prediction was a correct prediction or misprediction.

4) Another code fingerprint may be a branch history value when a given instruction is executed. In such an embodiment, the fingerprint consists of a sequence of 0's and 1's, where 1 means the branch was taken, and 0 means the branch was not taken. When a branch instruction is executed, either a 1 or a 0 is shifted into a fingerprint register 104, depending on whether the branch was taken or not taken.

5) A code fingerprint may be a call signature at a given instruction, where the call signature is a binary value that is a function of the sequence of call and return instructions that have previously been executed when an instruction is executed. Such a fingerprint may also be a historical sequence of successive call signatures at a given instruction that consists of a number of most-recent values of the call signature at the given instruction.

6) Another code fingerprint may be the value of come from address register (CFAR) of the processor 101 at a given instruction, where the CFAR contains the address of the most-recently executed branch instruction that was taken.

7) There may also be code fingerprints that consist of counts of various events that occur between two instructions, such as pipeline cache stalls, data cache hits or misses, etc.

In embodiments, it should be appreciated that the fingerprint circuit 110 provides the ability to specify a particular fingerprint, and to continuously monitor execution of a software program 107 while checking if that fingerprint is recognized. Upon recognition of the fingerprint, the fingerprint circuit 110 immediately issues a lightweight interrupt (e.g., EBB) that alerts an EBB handler to either to request the compiler 120 to recompile the compiled code or to recompile it, itself.

FIG. 2 depicts a fingerprint recognition function/detector of the fingerprint circuit 110 according to an embodiment. A fingerprint recognition function/detector may include hardware that detects, e.g., a specific sequence of load instruction data cache hits and misses in the shift register. This shift register is referred to as a fingerprint register 104 in the processor 101, since the contents of the fingerprint register 104 represent the actual execution output of the processor 101 (actual fingerprint), which is in this case the sequence of the most-recent data cache hits and misses. Such a fingerprint register 104 may be of arbitrary length. In one implementation, either 32 or 64 bits may be suitable for the fingerprint register 104.

In FIG. 2, the sequence of 1's and 0's in the fingerprint register 104 may represent the most-recent history of load instruction data cache hits and misses, where a '0' indicates a data cache miss and a '1' indicates a data cache hit. An implementation may have one of these fingerprint registers 104 for each level of the cache. As shown in FIG. 2, fingerprint register 104 receives input from a cache 103 (and/or from main memory 105) via load instruction indicator 203 and cache hit indicator 204. Whenever load instruction indicator 203 indicates a load instruction, a '1' is input into the fingerprint shift register 104 if the instruction results in a cache hit, and a '0' is loaded into the fingerprint shift register 104 when the instruction results in a cache miss (i.e., a load instruction with no cache hit). An observed fingerprint is output on fingerprint output 250; the observed fingerprint gives a snapshot of the cache hit/miss behavior of the current workload and may be used to identify the recent cache hit/miss behavior of load instructions in the workload. The fingerprint register 104 may be of any appropriate size, and the observed fingerprint that is output on fingerprint output 250 may be the entire contents of the fingerprint register 104 in some embodiments or a subset of the contents of fingerprint register 104. FIG. 2 is shown for illustrative purposes only; a fingerprint module comprising a shift register may measure any aspect of processor performance in various embodiments such as branch prediction hits and misses, branches taken and not taken, etc., where a 1 represents a correctly predicted or taken branch and a 0 represents a mispredicted or not taken branch, respectively.

The fingerprint circuit 110 may perform ongoing monitoring of the output of the application 107 to determine when to indicate that recompilation of the code is necessary. In one implementation, the instruction at which to sample (i.e., begin monitoring) the fingerprint register 104 in FIG. 2 may be identified by an instruction prefix or suffix, where the prefix or suffix consists of an additional field either at the beginning or end of the instruction image (i.e., the instruction). FIG. 3A depicts an instruction 302 with an example prefix field 304 for a prefix (e.g., XYZ), and FIG. 3B depicts an instruction 306 with an example suffix field 308 for a suffix (e.g., JKL), according to an embodiment. In FIGS. 3A and 3B, the prefix and suffix may be bits added to the beginning or end of the instruction images 302, 306. Most instructions have an opcode field and one or more operand fields. In the example instructions 302, 306, the instruction opcode is in the OPCODE field opcode, the destination register number (#) is in the RT field, and the source register number (#) is in the RA field, and the DI field is an input variable. The prefix field 304 is an additional field added before the instruction image, while the suffix field 308 is an additional field appended to the end of the instruction image. The prefix field 304 and the suffix field 308 can be set to a value to indicate that the respective field 304, 308 is included in the fingerprint and/or to indicate that the fingerprint 165 is sampled (monitored) at that instruction.

Additionally, a special form of no operation (nop) instruction may be used to identify the instruction at which to sample/monitor the fingerprint.

Embodiments may also be configured to recognize a whether a measured fingerprint representing a sequence of operations such as those described above (e.g., cache hit/miss sequence) is within a given hamming distance of the expected value of the sequence. If the measured sequence is outside a specified hamming distance from the expected sequence, an EBB occurs, otherwise the program continues uninterrupted.

Figure 4:
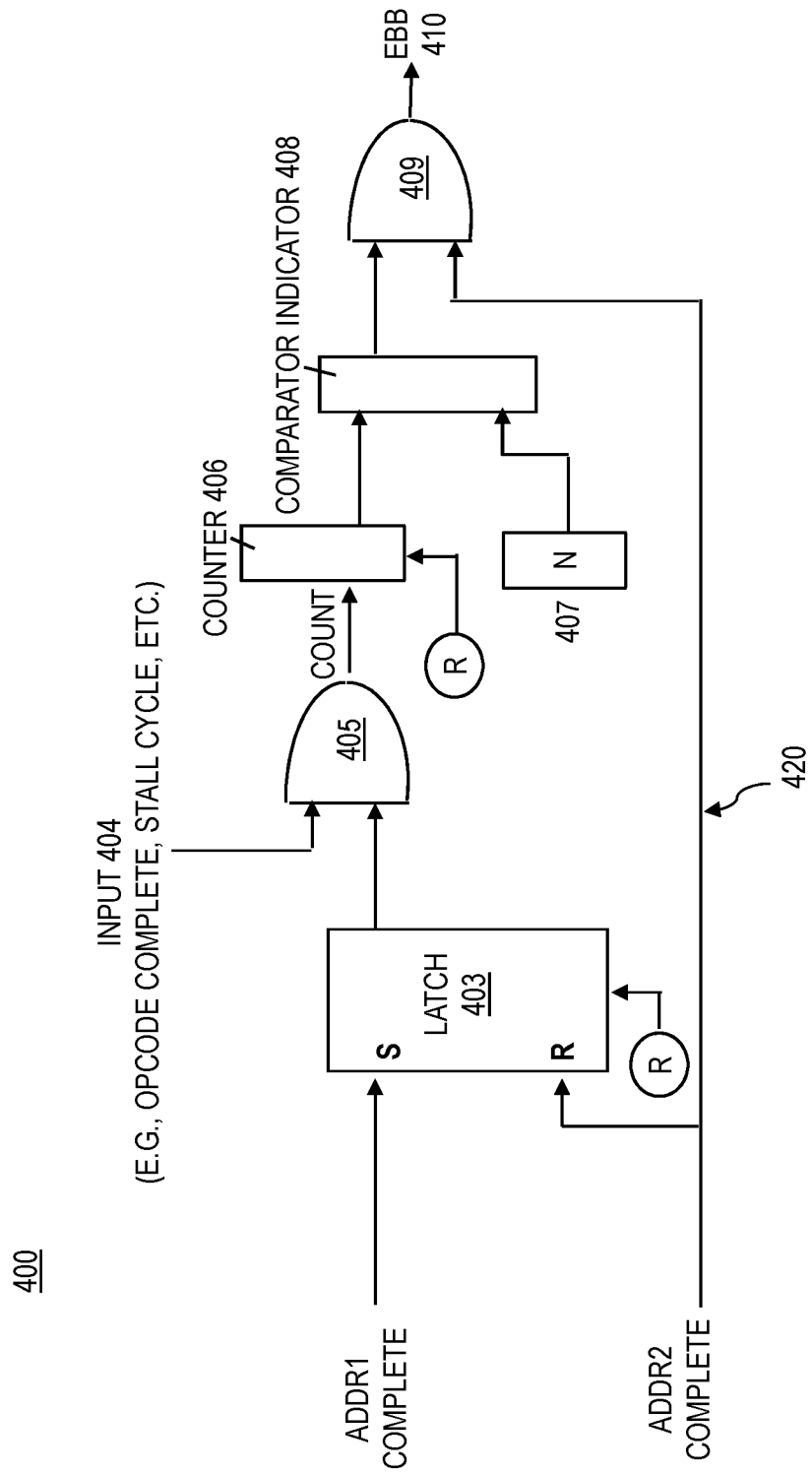
FIG. 4 depicts a fingerprint recognition function of the fingerprint circuit in accordance with an embodiment.

FIG. 4 depicts an example fingerprint recognizer/detector 400 for recognition of fingerprints that consists of counts of various events between two specified instructions according to an embodiment. The logic in FIG. 4 is initialized by resetting counter 406 and latch 403, as depicted by "R" in FIG. 4. After this initialization, latch 403 output is set to "1" when the instruction at ADDR completes. Latch 403 output is sent to AND gate 405, which gates input signal 404 to counter 406 whenever latch 403 output signal is set to 1. Output of counter 406 is sent to comparator indicator 408, which compares output of counter 406 with a value, N. The value N is specified in fingerprint 165 in FIG. 5 as explained later. Finally, comparator indicator 408 is sent to AND gate 409, which outputs a signal if indicator is true when the instruction at ADDR2, which is specified in fingerprint 165 in FIG. 5, completes. The output of AND gate 409 causes an EBB 410. Thus, the EBB 410 occurs if counter 406 is either more (or less, depending on the embodiment) than N (407) when the instruction at ADDR2 completes. This EBB alerts the application 107 that an excessive (or insufficient, depending on the embodiment) number of events (e.g., cache misses, stall cycles, etc.) have occurred between the completion of the instruction at ADDR1 and the instruction at ADDR2, and therefore code recompilation is by the compiler 120. (The specific event that is counted is specified in fingerprint 165 in FIG. 5 as explained later.) If the value of counter 406 is does not indicate that an excessive (or insufficient, depending on the embodiment) number of events have occurred when the instruction at ADDR2 is completed, however, then no EBB occurs. FIG. 4 is shown for illustrative purposes only; a fingerprint detector to determine when to trigger code recompilation such as is shown in these figures may monitor any appropriate set of instruction completions and may, in some embodiments, simultaneously monitor multiple sets of instruction completions either between the same or different start and end addresses.

Figure 5:
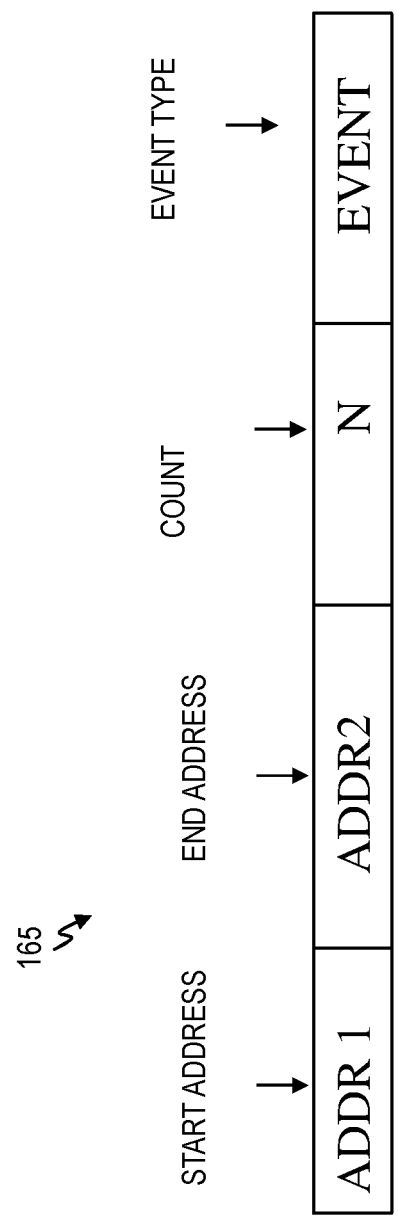
FIG. 5 depicts an example fingerprint table according to an embodiment.

FIG. 5 shows how an embodiment identifies ADDR1, ADDR2, and N for the logic of FIG. 4. For example, ADDR1 in FIG. 4 is the starting address at which latch 403 of FIG. 4 is set, ADDR2 is the address at which latch 403 is reset and a signal is sent AND gate 409, N is the value of register N 407, and EVENT TYPE indicates an event type (e.g., vector instruction completions, stall cycles, etc.) that is signaled on input 404. Accordingly, N is the number of expected events of the indicated type (e.g. vector instructions, stall cycles, etc.) that are to be verified to have occurred between the completion of the instruction at ADDR1 and the completion of the instruction at ADDR2. Embodiments may use multiple such fingerprints, each being identical except for the EVENT TYPE field in order to recognize multiple types of events between the addresses instead of a single event. The fingerprint circuit 110 may also have multiple such fingerprints that are all simultaneously monitored, either between the same instruction addresses or different instruction addresses.

Example situations indicating that a code recompilation is necessary include unexpected changes to cache hit rates, branch prediction accuracies, pipeline stall rates, execution unit usage rates, or any other aspect of processor behavior that indicates that a recompilation may improve performance. Also, a significant deviation from an expected sequential behavior, such as cache hit/miss pattern may indicate the need to recompile. For example, when performance is satisfactory, a compiler may sample the value of one or more fingerprint registers 104. The compiler may then configure fingerprint circuits 110 to recognize when such fingerprints deviate from the sampled values. For example, a fingerprint circuit 110 that recognizes sequential behavior may be configured to cause an EBB when the observed fingerprint differs from the expected fingerprint 165 by a given hamming distance. Similarly, a rate-based fingerprint circuit 110 may be configured to cause an EBB when the cache hit rate is less than, for example, 90% than the value of the fingerprint that was observed during a time when performance is satisfactory. Embodiments may also recognize that there is a need for recompilation only when a set of multiple fingerprints deviate from their expected values.

In response to the EBB, the compiler may restructure the object code in any manner, including unrolling loops, using different execution units (e.g., use a vector unit instead of an arithmetic unit), changing register usage, reordering instructions, changing the locations of branch instructions or providing branch hints so as to improve branch predictions, or making any other modification such that improved performance or behavior will result.

Figure 6:
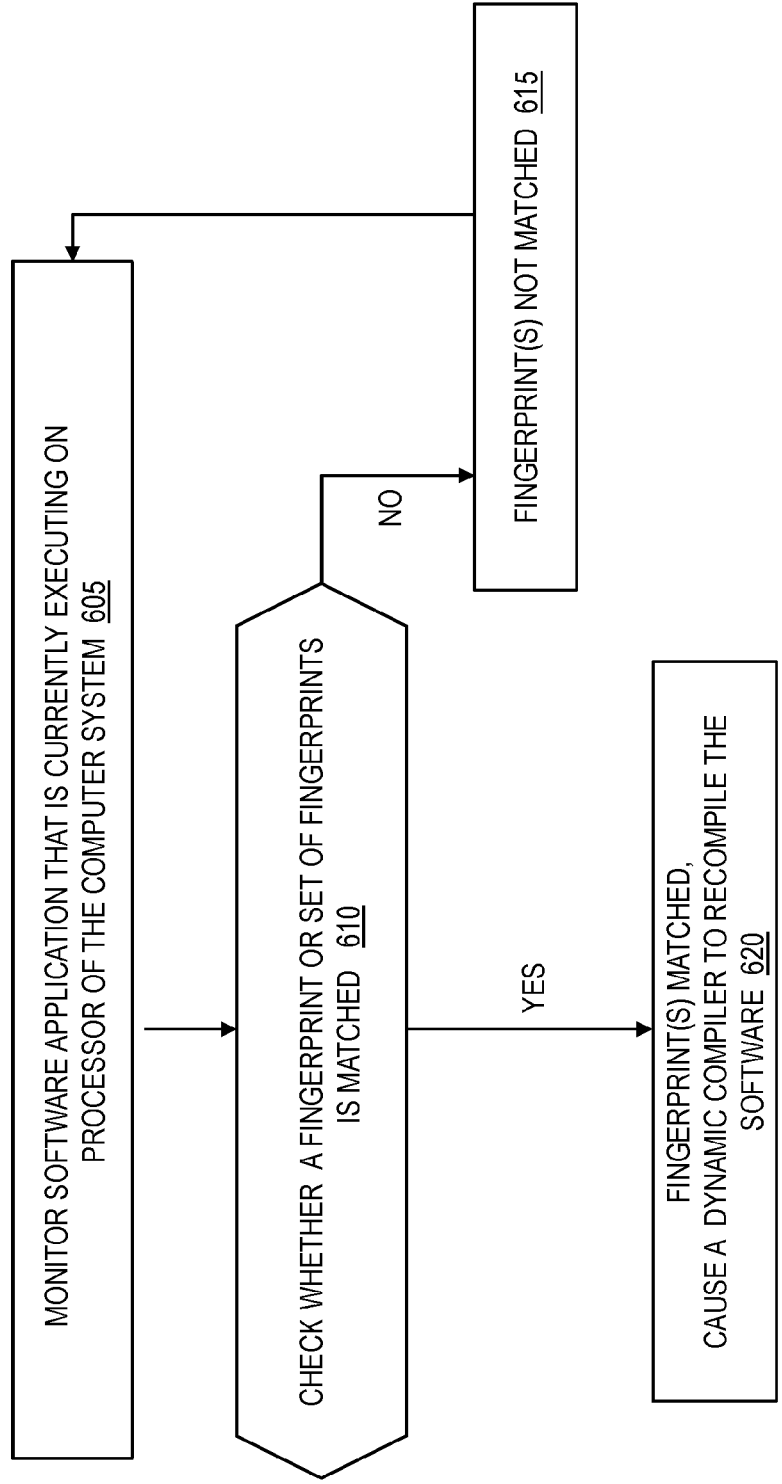
FIG. 6 depicts a flow chart of a behavior based code recompilation triggering scheme in accordance with an embodiment.

FIG. 6 is a flow chart of a computer implemented method 600 for behavior based code recompilation triggering scheme by one or more fingerprint circuits 110 on processor 101 according to an embodiment.

At block 605, fingerprint circuit 110 is configured to monitor software application 107 that is currently executing on processor 101 of the computer system 100.

At block 610, the fingerprint circuit 110 is configured to determine whether a fingerprint 165 is present in software application 107 currently executing on the processor 101 of the computer system 101, where the fingerprint comprises a representation of a sequence of behavior that occurs in the processor 101 while the software application 107 is executing.

At block 615, in response to determining that the fingerprint is not present in the software application currently executing on the processor 101, the fingerprint circuit is configured to continue monitoring the software application 107 executing on the processor 101 for the fingerprint 165.

At block 620, in response to determining that the fingerprint 165 is present in the software application 107 currently executing on the processor 101, the fingerprint circuit 110 is configured to cause the compiler 120 to recompile the software application 107.

The recompilation comprises replacing a first compiled version of the software application 107 with a second compiled version of the software application 107, where the second compiled version of software application 107 provides improved performance or improved behavior. Such restructuring may include unrolling loops, using different execution units (e.g., use a vector unit instead of an arithmetic unit), changing register usage, reordering instructions, changing the locations of branch instructions or providing branch hints so as to improve branch predictions, or making any other modification such that improved performance or behavior results.

Performing a lightweight interrupt to stop the software application 107 from executing prior to performing the recompilation. Causing the compiler 120 to perform the recompilation to the software comprises the causing a lightweight interrupt to trigger an lightweight interrupt handler that either requests the compiler 120 to recompile the software or that recompiles it, itself.

Technical effects and benefits include improved performance of a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for a behavior based code recompilation triggering scheme, the method comprising:
 determining whether a fingerprint matches an output of software that is currently executing on a processor of a computer system, the fingerprint comprising a representation of a sequence of behavior that occurs in the processor while the software is executing, wherein the fingerprint is selected from the group consisting of a specific branch taken and not taken sequence in a predefined order of branches taken and not taken, and a specific branch prediction hit and miss sequence in a predefined order of branch prediction hits and misses;

in response to determining that the fingerprint does not match the output in the software currently executing on the processor, continuing to monitor the software executing on the processor for the fingerprint; and in response to determining that the fingerprint does match the output in the software currently executing on the processor, causing a compiler to perform a recompilation to the software, wherein the recompilation to the software comprises unrolling loops, changing register usage, changing locations of branch instructions, and providing branch hints to improve branch predictions.

2. The method of claim 1, wherein the recompilation to the software comprises replacing a first version of the software with a second version of the software.

3. The method of claim 1, wherein a fingerprint circuit causes the compiler to recompile the software;
wherein the fingerprint includes a specific data cache hit and miss sequence in a predefined order of cache hits and misses.

4. The method of claim 1, wherein the recompilation to the software further comprises at least one of using different execution units and reordering instructions.

5. The method of claim 1, further comprising performing an interrupt to stop the software from executing prior to performing the recompilation.

6. The method of claim 5, wherein causing the compiler to perform the recompilation to the software comprises alerting a handler to request the compiler to recompile the software.

7. The method of claim 5, wherein causing the compiler to perform the recompilation to the software comprises the compiler receiving the interrupt as a trigger for recompiling the software.

8. A computer program product for a behavior based code recompilation triggering scheme, the computer program product comprising:
a computer readable storage medium having program instructions embodied therewith, the program instructions readable by a processing circuit to cause the processing circuit to perform a method comprising:
determining whether a fingerprint matches an output of software that is currently executing on a processor of a computer system, the fingerprint comprising a representation of a sequence of behavior that occurs in the processor while the software is executing, wherein the fingerprint is selected from the group consisting of a specific branch taken and not taken sequence in a predefined order of branches taken and not taken, and a specific branch prediction hit and miss sequence in a predefined order of branch prediction hits and misses;
in response to determining that the fingerprint does not match the output in the software currently executing on the processor, continuing to monitor the software executing on the processor for the fingerprint; and
in response to determining that the fingerprint does match the output in the software currently executing on the processor, causing a compiler to perform a recompilation to the software, wherein the recompilation to the software comprises unrolling loops, changing register usage, changing locations of branch instructions, and providing branch hints to improve branch predictions.

9. The computer program product of claim 8, wherein the recompilation to the software comprises replacing a first version of the software with a second version of the software.

10. The computer program product of claim 8, wherein a fingerprint circuit causes the compiler to recompile the software.

11. The computer program product of claim 8, wherein the recompilation to the software further comprises at least one of using different execution units and reordering instructions.

12. The computer program product of claim 8, the method further comprising performing an interrupt to stop the software from executing prior to performing the recompilation.

13. The computer program product of claim 12, wherein causing the compiler to perform the recompilation to the software comprises alerting a handler to request the compiler to recompile the software.

14. The computer program product of claim 12, wherein causing the compiler to perform the recompilation to the software comprises the compiler receiving the interrupt as a trigger for recompiling the software.

15. A computer system for a behavior based code recompilation triggering scheme, the system comprising:
a memory; and
a processor, communicatively coupled to the memory, the computer system configured to perform a method comprising:
determining whether a fingerprint matches an output of software that is currently executing on the processor of the computer system, the fingerprint comprising a representation of a sequence of behavior that occurs in the processor while the software is executing, wherein the fingerprint is selected from the group consisting of a specific branch taken and not taken sequence in a predefined order of branches taken and not taken, and a specific branch prediction hit and miss sequence in a predefined order of branch prediction hits and misses;
in response to determining that the fingerprint does not match the output in the software currently executing on the processor, continuing to monitor the software executing on the processor for the fingerprint; and
in response to determining that the fingerprint does match the output in the software currently executing on the processor, causing a compiler to perform a recompilation to the software, wherein the recompilation to the software comprises unrolling loops, changing register usage, changing locations of branch instructions, and providing branch hints to improve branch predictions.

16. The computer system of claim 15, wherein the recompilation to the software comprises replacing a first version of the software with a second version of the software.

17. The computer system of claim 15, wherein a fingerprint circuit causes the compiler to recompile the software.

18. The computer system of claim 15, wherein the recompilation to the software further comprises at least one of using different execution units and reordering instructions.

19. The computer system of claim 15, the method further comprising performing an interrupt to stop the software from executing prior to performing the recompilation.

20. The computer system of claim 19, wherein causing the compiler to perform the recompilation to the software comprises alerting a handler to request the compiler to recompile the software.

* * * * *